Nov. 17, 1953  J. D. BATES  2,659,255
DEVICE FOR APPLYING THREADED SCREWS OR BOLTS
Filed March 19, 1952

INVENTOR
Joseph D. Bates, Deceased,
By Josephine A. Bates and
Henry C. Avery, Executors BY *Scrivener & Parker*

ATTORNEYS

Patented Nov. 17, 1953

2,659,255

UNITED STATES PATENT OFFICE 2,659,255

DEVICE FOR APPLYING THREADED SCREWS OR BOLTS

Joseph D. Bates, deceased, late of West Springfield, Mass., by Josephine A. Bates and Henry C. Avery, executors, West Springfield, Mass., assignors to Josephine A. Bates, West Springfield, Mass.

Application March 19, 1952, Serial No. 277,502

3 Claims. (Cl. 81—57)

This invention relates, in its broad aspect, to such devices as screws, threaded bolts and the like, which are screwed into one or more pieces of material to effect some fastening function. More particularly the invention relates to, and is intended to provide, a device for forming a hole in one or more pieces of material and simultaneously lining it with an externally screw-threaded tube or hollow screw for the same purpose and function as usual screws and threaded bolts or, additionally, to provide part of a catch or locking device.

In the co-pending application of Joseph D. Bates, Serial No. 231,811, filed June 15, 1951, there is described and claimed a device which is operative simultaneously to drill a hole and line it with a threaded, hollow tube which performs the function of a screw or threaded bolt. In this device the two parts, i. e. the drill and the threaded screw, are turned as one part and therefore at the same speed.

By the present invention there is provided a device which performs the same function as that of the co-pending application but in an improved manner and which is so constructed and operative that the drill rotates at a greater speed than the screw, thus causing the advance of the screw into the wood or other material to lag behind that of the drill. This effect or result is advantageous for many reasons, among these being that the drill operates more efficiently at higher speeds, while the screw should be rotated and advanced at a lower speed. By this invention there is also provided improved means for removing chips and dust produced by the boring action of the drill.

Other novel features and advantages of the invention will be made apparent by the following description and the annexed drawing of a preferred embodiment which, it will be understood, is only illustrative of the many embodiments which the invention may take.

Figure 1:
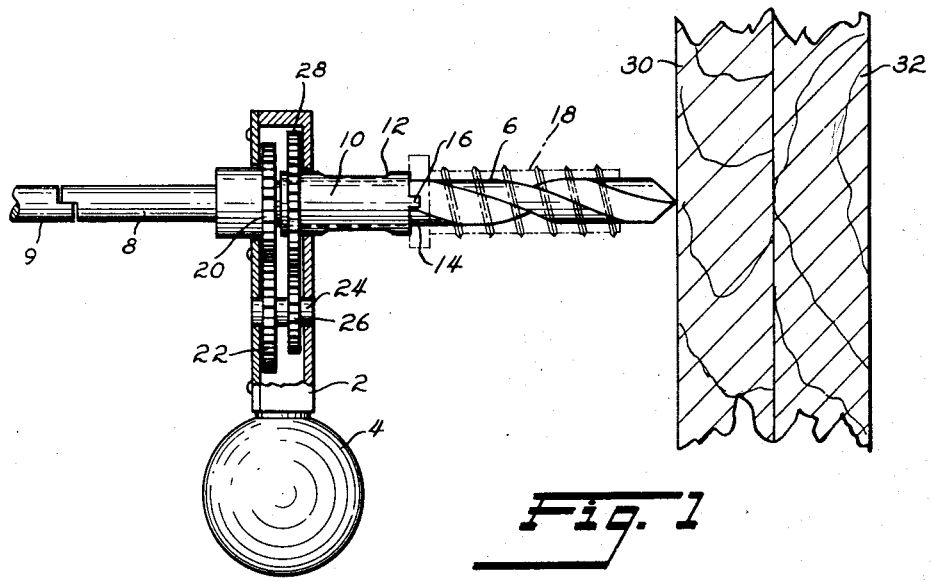
Figure 2:
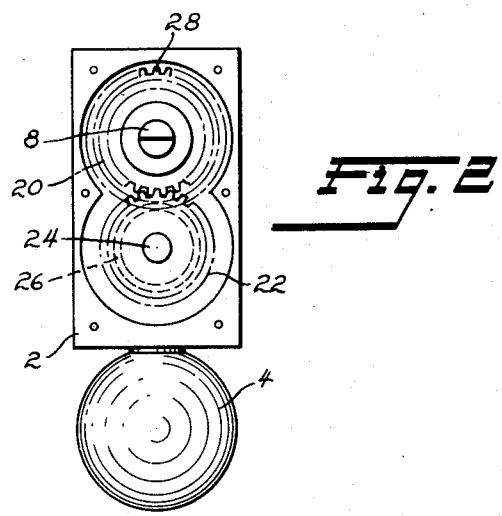

In the drawings forming part of this application, in Fig. 1 is a side view, and Fig. 2 is a front view, of a screw-applied and boring device according to the invention.

This embodiment comprises a casing or housing 2 having a handle part 4. Extending through the housing part 2 and journaled therein for rotary motion about its own axis is an elongated member of circular cross-section having a drill part 6 formed throughout a part of the length thereof and being disposed at one side of the casing and having a part 8 at the other side of the casing for attachment to the shaft 9 of a motor or other means by which the entire elongated member including the drill part may be rotated. The drill is pointed and fluted in the usual manner of such a device and, when rotated, will advance into, and form a hole in, wood or other material to which it is applied.

A screw-applying part is journaled in the casing 2 for rotation about its own axis and comprises a cylinder 10 closely surrounding and fitting the drill part 6 and extending from the casing throughout only a part of the length of the drill, thus leaving the entering end and a considerable part of the drill uncovered. The screw-applying part and the drill part are not rigidly connected, except through means to be described hereinafter, and these parts may therefore rotate with respect to each other and at different speeds. Two elongated apertures 12 are formed in diametrically-separated parts of the cylinder 10 and permit access to the drill part 6 within the cylinder 10. On the leading edge wall 14 of the cylinder 10 there are formed two or more lugs 16 which are adapted to engage in the transverse slot or slots in the head of a hollow screw device 18 which surrounds the drill part 6 and which is introduced into the wood or other material.

Means are provided by the invention for rotating the drill part 6 and the screw-applying cylinder 10 at different speeds and, in a preferred embodiment of the invention, for rotating the screw-applying cylinder more slowly than the drill. Such means may comprise gearing connecting these two parts and, in the disclosed embodiment, this gearing comprises a first gear 20 which is mounted on the drill shaft 6, 8 within the casing 2 and which meshes with a second gear 22 of equal diameter which is mounted on and attached to a jack-shaft 24 which is journaled in the casing. This jack-shaft also carries a second gear 26 of lesser diameter than gears 20, 22 which meshes with a fourth gear 28 which is of larger diameter than gears 20, 22 and which is mounted on the screw-applying cylinder 10. The described gear system is such that rotation of the drill part 6, 8 will cause the screw-applying cylinder 10 to be rotated with respect to but at a lower speed than, the elongated member on which it is journaled, including the drill part thereof.

In the use and operation of the described device, if it is desired to apply a hollow screw 18 as a lining member within an opening in a piece of wood 30 or to attach together two pieces of wood 30, 32, the hollow screw is first positioned on the drill part, as shown, with the lugs 16 positioned in the transverse slots in the head of the screw. The pointed end of the drill is now applied to the part 30 and the drill is rotated by suitable means 9 applied to the end part 8 of the drill. The rotation of the entire drill part is transmitted through the gearing 20, 22, 26, 28 and, because of the described gear ratios, causes rotation of the screw-applying cylinder 10 at a lower speed, thus simultaneously forming an opening in part 30 or parts 30, 32 and lining the same with the externally threaded screw member 18. As the drill part 6 removes chips and dust from the part 30 or parts 30, 32 these will move rearwardly along and within the flutes of the drill and will pass into the cylinder 10 and fall outwardly therefrom through the apertures 12, thus insuring clearance of the chips and dust and preventing clogging of the parts.

While there is described and illustrated in this application one embodiment which the invention may take it will be understood that other embodiments, as well as modifications of that disclosed, may be made and practised without departing in any way from the spirit or scope of the invention, for the limits of which reference must be had to the appended claims.

What is claimed is:

1. A device for simultaneously boring a hole and applying a hollow, threaded screw as a lining for the hole, comprising a drill for boring the hole, a cylindrical member closely surrounding the drill and mounted for rotation relatively thereto and extending over only a part of the length of the drill leaving the entering end part thereof free to receive a hollow threaded screw, means formed on the leading edge of said cylindrical member for engaging a hollow externally threaded screw mounted on the drill to rotate the same when the cylindrical member is rotated, and means connecting the drill and the cylindrical member to cause the cylindrical member to be rotated at a speed different from that of the drill.

2. A device according to claim 1, comprising in addition at least one aperture formed in the wall of the cylindrical member to permit the discharge of chips and dust moving along the drill during the boring.

3. A device for simultaneously boring a hole and applying a hollow, threaded screw as a lining for the hole, comprising a casing member, an elongated member mounted in the casing for rotation about its own axis and on one side of the casing being formed with flutes to provide a pointed drill for boring a hole and at the other side of the casing having means for attachment to a rotating device in order to impart rotary movement thereto, a cylindrical member mounted in the casing for rotation about its own axis and closely surrounding the drill part of the elongated cylindrical member and extending throughout only a part of the length thereof leaving the outer end of the drill free to receive a hollow, threaded screw and having means formed on the leading edge thereof for releasable attachment to the screw to impart rotary movement thereto when the cylindrical member is rotated, and speed reduction means connecting the elongated member and the cylindrical member to transmit rotary movement of the elongated member to the cylindrical member to cause the cylindrical member to be rotated at a speed less than that of the elongated member.

JOSEPHINE A. BATES.
HENRY C. AVERY.

Co-executors of the last will and testament of Joseph D. Bates, deceased.

References Cited in the file of this patent

UNITED STATES PATENTS

| Number | Name | Date |
|---|---|---|
| 2,494,229 | Collison | Jan. 10, 1950 |
| 2,532,027 | Maddox | Nov. 28, 1950 |
| 2,558,897 | Akins | July 3, 1951 |

FOREIGN PATENTS

| Number | Country | Date |
|---|---|---|
| 541,345 | Great Britain | Nov. 24, 1941 |